UNITED STATES PATENT OFFICE.

AUGUST KLAGES AND FRITZ SOMMER, OF SALBKE-WESTERHÜSEN-ON-THE-ELBE, GERMANY.

STABLE PERBORATE MIXTURE YIELDING HYDROGEN PEROXID.

996,773. Specification of Letters Patent. Patented July 4, 1911.

No Drawing. Application filed March 4, 1911. Serial No. 612,199.

*To all whom it may concern:*

Be it known that we, AUGUST KLAGES and FRITZ SOMMER, both subjects of the German Emperor, and residents of Salbke-Westerhüsen-on-the-Elbe, in the Kingdom of Prussia, German Empire, have invented certain new and useful Improvements in Stable Perborate Mixtures Yielding Hydrogen Peroxid, of which the following is a full, clear, and exact specification.

Our invention relates to the production of stable perborate mixtures from sodium perborate and a solid acid salt, which mixtures will yield hydrogen peroxid on coming in contact with water. The efficiency of the sodium perborate as a disinfectant in an aqueous solution is due to its capability of being dissociated into hydrogen peroxid and boric acid. Since the sodium perborate is not readily soluble and is only partially dissociated, its full efficiency can be attained only by liberating the hydrogen peroxid from the salt by adding diluted acids. This dissociation has been obtained heretofore by the addition of phosphoric acid or of acid salts to the aqueous solutions of sodium perborate. Or it has been accomplished by adding to water a mixture of a perborate, containing a lesser quantity of water of crystallization than completely hydrated perborates, with solid acid substances.

The most satisfactory and stable perborate is the granular crystallized salt sodium perborate of the formula $NaBO_3 + 4H_2O$, said salt containing 10.4% of active oxygen.

It is the object of our invention to produce stable mixtures of this salt, which mixtures on coming in contact with water will yield peroxid of hydrogen. We have found that for this purpose the readily crystallizing sodium acid salts of the sulfobenzoic acids, $C_6H_4(COOH).SO_3Na$, which are remarkable for their pure acid taste as well as their harmlessness and easy solubility, will form non-hygroscopic, stable mixtures with the crystallized sodium perborate. In an aqueous solution such mixtures decompose to yield hydrogen peroxid, boric acid and sodium sulfo-benzoate.

Example: Mix 10 kg. of crystallized sodium perborate with 14.6 kg. of sodium acid sulfo-benzoate, and grind to form a fine powder. If 12 gms. of this mixture be dissolved in 100 ccm. of water, it will correspond to a 1% solution of hydrogen peroxid, and which solution will at the same time contain 1.8% of boric acid.

We claim:—

1. As a new composition of matter, a mixture of a crystallized perborate with an acid salt of a sulfobenzoic acid, substantially as described.

2. As a new composition of matter, a mixture of crystallized sodium perborate with an acid salt of a sulfobenzoic acid, substantially as described.

3. As a new composition of matter, a mixture of 10 parts crystallized, finely ground sodium perborate with 14.6 parts of finely ground sodium acid sulfo-benzoate.

In testimony, that we claim the foregoing as our invention, we have signed our names in presence of two subscribing witnesses.

AUGUST KLAGES.
FRITZ SOMMER.

Witnesses:
HENRY HASPER,
WOLDEMAR HAUPT.